(12) United States Patent
Hirata et al.

(10) Patent No.: US 11,090,755 B2
(45) Date of Patent: Aug. 17, 2021

(54) WELDING MATERIAL FOR FERRITIC HEAT-RESISTANT STEEL, WELDED JOINT FOR FERRITIC HEAT-RESISTANT STEEL, AND METHOD FOR PRODUCING WELDED JOINT FOR FERRITIC HEAT-RESISTANT STEEL

(71) Applicant: NIPPON STEEL & SUMITOMO METAL CORPORATION, Tokyo (JP)

(72) Inventors: Hiroyuki Hirata, Tokyo (JP); Kana Jotoku, Tokyo (JP); Tomoaki Hamaguchi, Tokyo (JP); Toshihide Ono, Tokyo (JP); Katsuki Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 428 days.

(21) Appl. No.: 16/060,121

(22) PCT Filed: Dec. 16, 2016

(86) PCT No.: PCT/JP2016/087585
§ 371 (c)(1),
(2) Date: Jun. 7, 2018

(87) PCT Pub. No.: WO2017/104815
PCT Pub. Date: Jun. 22, 2017

(65) Prior Publication Data
US 2018/0354059 A1    Dec. 13, 2018

(30) Foreign Application Priority Data

Dec. 18, 2015 (JP) .............................. JP2015-246810

(51) Int. Cl.
| | |
|---|---|
| *B23K 9/167* | (2006.01) |
| *C22C 38/32* | (2006.01) |
| *C22C 38/54* | (2006.01) |
| *C22C 38/46* | (2006.01) |
| *C22C 38/44* | (2006.01) |
| *C22C 38/04* | (2006.01) |
| *C22C 38/42* | (2006.01) |
| *C22C 38/52* | (2006.01) |
| *C22C 38/50* | (2006.01) |
| *C22C 38/48* | (2006.01) |
| *B23K 9/23* | (2006.01) |
| *B23K 35/30* | (2006.01) |
| *C22C 38/02* | (2006.01) |
| *C22C 38/06* | (2006.01) |
| *C22C 38/22* | (2006.01) |
| *C22C 38/24* | (2006.01) |
| *C22C 38/26* | (2006.01) |
| *C22C 38/30* | (2006.01) |

(52) U.S. Cl.
CPC ................. *B23K 9/167* (2013.01); *B23K 9/23* (2013.01); *B23K 35/3086* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/30* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01)

(58) Field of Classification Search
CPC ...... B23K 35/3086; B23K 9/167; B23K 9/23; C22C 38/02; C22C 38/04; C22C 38/06; C22C 38/22; C22C 38/24; C22C 38/26; C22C 38/30; C22C 38/32; C22C 38/42; C22C 38/44; C22C 38/46; C22C 38/48; C22C 38/50; C22C 38/52; C22C 38/54
USPC ............. 219/137 WM, 137 R, 136, 73, 73.1; 420/40
See application file for complete search history.

(56) References Cited

U.S. PATENT DOCUMENTS

| | | | | |
|---|---|---|---|---|
| 3,251,683 A | * | 5/1966 | Hammond | ............... C22C 38/52 420/38 |
| 5,421,920 A | * | 6/1995 | Yamamoto | ............... C21D 8/00 148/546 |
| 5,945,064 A | * | 8/1999 | Komai | .................. B23K 35/308 420/40 |

(Continued)

FOREIGN PATENT DOCUMENTS

| | | |
|---|---|---|
| JP | 04-371551 | 12/1992 |
| JP | 04-371552 | 12/1992 |
| JP | 08-187592 | 7/1996 |
| JP | 09-122971 | 5/1997 |
| JP | 09-308989 | 12/1997 |
| JP | 2002-241903 | 8/2002 |

(Continued)

*Primary Examiner* — Dana Ross
*Assistant Examiner* — Ket D Dang
(74) *Attorney, Agent, or Firm* — Clark & Brody LP

(57) ABSTRACT

The present invention provides a welding material for ferritic heat-resistant steel, a welded joint for ferritic heat-resistant steel, and a method for producing the welded joint for to form a weld metal having a high creep strength and a high toughness in welding a ferritic heat-resistant steel that contains B. The welding material for ferritic heat-resistant steel has a chemical composition containing, in mass %, C: 0.06 to 0.10%, Si: 0.1 to 0.4%, Mn: 0.3 to 0.7%, Co: 2.6 to 3.4%, Ni: 0.01 to 1.10%, Cr: 8.5 to 9.5%, W: 2.5 to 3.5%, Nb: 0.02 to 0.08%, V: 0.1 to 0.3%, Ta: 0.02 to 0.08%, B: 0.007 to 0.015%, N: 0.005 to 0.020%, with the balance being Fe and impurities, and satisfying Formula (1):

$$0.5 \leq Cr+6Si+1.5W+11V+5Nb+10B-40C-30N-4Ni-2Co-2Mn \leq 10.0 \quad (1).$$

20 Claims, No Drawings

(56) References Cited

U.S. PATENT DOCUMENTS

| | | | | |
|---|---|---|---|---|
| 2001/0027966 A1* | 10/2001 | Iwatsubo | ............. | B23K 35/308 |
| | | | | 219/137 WM |
| 2009/0120536 A1* | 5/2009 | Tomita | .................... | C22C 38/24 |
| | | | | 148/326 |
| 2014/0003989 A1* | 1/2014 | Kurihara | ................ | C21D 6/004 |
| | | | | 420/40 |
| 2014/0286698 A1* | 9/2014 | Osuki | ..................... | C22C 38/58 |
| | | | | 403/271 |

FOREIGN PATENT DOCUMENTS

| | | |
|---|---|---|
| JP | 2004-300532 | 10/2004 |
| JP | 2010-007094 | 1/2010 |
| WO | 2008/149703 | 12/2008 |

* cited by examiner

WELDING MATERIAL FOR FERRITIC HEAT-RESISTANT STEEL, WELDED JOINT FOR FERRITIC HEAT-RESISTANT STEEL, AND METHOD FOR PRODUCING WELDED JOINT FOR FERRITIC HEAT-RESISTANT STEEL

TECHNICAL FIELD

The present invention relates to a welding material, a welded joint, and a method for producing a welded joint, more specifically relates to a welding material for ferritic heat-resistant steel, a welded joint for ferritic heat-resistant steel and method for producing a welded joint for ferritic heat-resistant steel.

BACKGROUND ART

In recent years, efforts have been made to increase temperature and pressure of steam conditions in thermal power generation, in order to increase thermal efficiency. A future operation under ultra super critical pressure conditions of 650° C. and 350 atmospheres is planned. A ferritic heat-resistant steel is inexpensive as compared with heat-resistant austenitic steel and a Ni-based heat-resistant steel. Furthermore, the ferritic heat-resistant steel has an advantage as a heat-resistant steel that it has a small coefficient of thermal expansion. For that reason, the ferritic heat-resistant steel is in widespread use in environments at high temperature and high pressure.

Japanese Patent Application Publication No. 4-371551 (Patent Literature 1), Japanese Patent Application Publication No. 4-371552 (Patent Literature 2), and Japanese Patent Application Publication No. 2002-241903 (Patent Literature 3) propose ferritic heat-resistant steels that are ready for conditions that are to become harsh in the future as described above. Ferritic heat-resistant steels disclosed in Patent Literature 1 and Patent Literature 2 each contains W and Mo of which contents are optimized, and each contains Co and B. This allows the ferritic heat-resistant steels of these literatures to have high strengths. A ferritic heat-resistant steel material disclosed in Patent Literature 3 is allowed to have a high strength by actively exploiting $M_{23}C_6$ carbide and an intermetallic compound phase that precipitate in martensite lath interfaces.

In some cases, a ferritic heat-resistant steel is used in a structure by being welded in a form of a welded joint. In these cases, a creep strength of a weld heat affected zone (hereafter, abbreviated as HAZ) of the welded joint can be decreased. Thus, Japanese Patent Application Publication No. 2004-300532 (Patent Literature 4), Japanese Patent Application Publication No. 2010-7094 (Patent Literature 5), and International Application Publication No. 2008/149703 (Patent Literature 6) propose ferritic heat-resistant steels that suppress a decrease in creep strength in an HAZ. A ferritic heat-resistant steel disclosed in Patent Literature 4 suppresses grain refinement in an HAZ by containing B at 0.003 to 0.03 mass %. This inhibits a decrease in creep strength in the HAZ. Ferritic heat-resistant steels disclosed in Patent Literature 5 and Patent Literature 6 each contains an abundance of B and each contains C of which content is adjusted according to a weld heat input or a B content. This suppresses a decrease in strength in an HAZ as well as liquation cracking during welding.

In a case where a ferritic heat-resistant steel containing an abundance of B is to be welded, a welding material is normally used. A weld metal formed using a commercial welding material for Ni-based heat-resistant alloy (e.g., JIS Z 3334 (2011) SNi6082) has a high creep strength and a high toughness. However, during welding, particularly in a root bed where a high dilution of a base material occurs, B flows from the base material in the weld metal. In this case, solidification cracking may occur. Therefore, a welding material used for welding a ferritic heat-resistant steel containing B is required to have a high creep strength and a high toughness in a weld metal as well as to prevent solidification cracking during welding.

Japanese Patent Application Publication No. 8-187592 (Patent Literature 7), Japanese Patent Application Publication No. 9-308989 (Patent Literature 8), and Japanese Patent Application Publication No. 9-122971 (Patent Literature 9) propose welding materials for ferritic heat-resistant steel that are excellent in creep strength, toughness, and weldability. A welding material of Patent Literature 7 contains 0.0005 to 0.006 mass % of B and makes (Mo+W)/(Ni+Co) 0.045 to 2.0. A welding material of Patent Literature 8 contains 0.0005 to 0.006 mass % of B as an optional element, makes (Mo+W)/(Ni+Co) and (0.5×Co+0.5×Mn+Ni) within predetermined ranges, and further makes a Cr equivalent within a predetermined range. A welding material of Patent Literature 9 can contain 0.02 mass % or less of B as an optional element, further has an Mn content of (0.0925-12.5 [% S]) % to 2.0%, and makes (Al+O) 0.02% or less.

However, when these welding materials are used in welding a ferritic heat-resistant material that contains an abundance of B, a sufficient creep strength of a weld metal may not be obtained in a stable manner.

CITATION LIST

Patent Literature

Patent Literature 1: Japanese Patent Application Publication No. 4-371551
Patent Literature 2: Japanese Patent Application Publication No. 4-371552
Patent Literature 3: Japanese Patent Application Publication No. 2002-241903
Patent Literature 4: Japanese Patent Application Publication No. 2004-300532
Patent Literature 5: Japanese Patent Application Publication No. 2010-7094
Patent Literature 6: International Application Publication No. 2008/149703
Patent Literature 7: Japanese Patent Application Publication No. 8-187592
Patent Literature 8: Japanese Patent Application Publication No. 9-308989
Patent Literature 9: Japanese Patent Application Publication No. 9-122971

SUMMARY OF INVENTION

Technical Problem

An objective of the present invention is to provide a welding material for ferritic heat-resistant steel, a welded joint for ferritic heat-resistant steel, and a method for producing a welded joint for ferritic heat-resistant steel that are capable of forming a weld metal having a high creep strength and a high toughness in welding a ferritic heat-resistant steel that contains B.

Solution to Problem

A welding material for ferritic heat-resistant steel according to the present invention has a chemical composition containing, in mass percent: C: 0.06 to 0.10%, Si: 0.1 to 0.4%, Mn: 0.3 to 0.7%, P: 0.01% or less, S: 0.003% or less, Co: 2.6 to 3.4%, Ni: 0.01 to 1.10%, Cr: 8.5 to 9.5%, W: 2.5 to 3.5%, Mo: less than 0.01%, Nb: 0.02 to 0.08%, V: 0.1 to 0.3%, Ta: 0.02 to 0.08%, B: 0.007 to 0.015%, N: 0.005 to 0.020%, Al: 0.03% or less, O: 0.02% or less, Cu: 0 to 1%, Ti: 0 to 0.3%, Ca: 0 to 0.05%, Mg: 0 to 0.05%, and rare earth metals: 0 to 0.1%, with the balance being Fe and impurities, and satisfying Formula (1):

$$0.5 \leq Cr+6Si+1.5W+11V+5Nb+10B-40C-30N-4Ni-2Co-2Mn \leq 10.0 \quad (1)$$

where, symbols of elements in Formula (1) are to be substituted by contents of corresponding elements (in mass percent).

A welded joint according to the present invention includes a weld metal for ferritic heat-resistant steel having the above-described chemical composition, and a base material made of a ferritic heat-resistant steel containing B.

A method for producing a welded joint according to the present invention includes a step of forming a weld metal by performing gas tungsten arc welding on a base material made of a ferritic heat-resistant steel with a weld heat input of 6 to 20 kJ/cm using the above-described welding material for ferritic heat-resistant steel, and a step of performing heat treatment on the weld metal formed on the base material at a heat treatment temperature of 740 to 780° C. for 0.5 to 4.0 hours per 25.4 mm thickness of the base material.

Advantageous Effects of Invention

The welding material for ferritic heat-resistant steel according to the present invention allows formation of a weld metal having a high creep strength and a high toughness in a case of welding a ferritic heat-resistant steel that contains B.

DESCRIPTION OF EMBODIMENTS

To solve the above problems, the present inventors conducted investigations and studies. Consequently, the present inventors obtained the following findings.

In a case of performing welding on a base material made of a ferritic heat-resistant steel that contains B to form a weld metal, creep strength of the weld metal is increased when the weld metal contains an appropriate amount of B. The reason for this is deemed to be as follows. An $M_{23}C_6$ carbide (M is an alloying element) is finely dispersed in prior-austenite grain boundaries and martensite lath boundaries. This $M_{23}C_6$ carbide delays martensite laths from recovering, resulting in increasing the creep strength. In a case where a B content of the base material is 0.005 to 0.020%, when a B content of the weld metal is 0.007% or more, a creep strength equivalent to or higher than that of the base material is obtained.

In contrast, an excessively high B content of the weld metal allows a high creep strength to be obtained but decreases toughness. The reason for this is deemed to be as follows. An excessively high B content causes rapid growth of martensite laths in martensitic transformation. This increases a packet size, and increases fracture unit area with respect to an impact. Furthermore, due to being a ferrite forming element, B promotes production of δ ferrite in the weld metal, leading to an increase in area fraction of the δ ferrite in the weld metal. It is considered that this causes decrease in toughness of the weld metal.

The following (A) to (C), when satisfied, can provide a weld metal that is capable of keeping a high toughness.

(A) The rapid growth of martensite laths can be inhibited by setting a B content of the weld metal at 0.015% or less.

(B) In the chemical composition of the weld metal, define F1=Cr+6Si+1.5W+11V+5Nb+10B−40C−30N−4Ni−2Co−2Mn. When F1 is 10.0 or less, formation of δ ferrite is inhibited, with a result that an area fraction of δ ferrite in the weld metal becomes 0.5% or less.

(C) S segregates during welding or in a process of postweld heat treatment, decreasing a sticking force of grain boundaries. Thus, an S content is set at 0.003 mass % or less. This increases toughness of the weld metal.

A welding material for ferritic heat-resistant steel of the present embodiment completed based on the above findings contains, in mass percent: C: 0.06 to 0.10%, Si: 0.1 to 0.4%, Mn: 0.3 to 0.7%, P: 0.01% or less, S: 0.003% or less, Co: 2.6 to 3.4%, Ni: 0.01 to 1.10%, Cr: 8.5 to 9.5%, W: 2.5 to 3.5%, Mo: less than 0.01%, Nb: 0.02 to 0.08%, V: 0.1 to 0.3%, Ta: 0.02 to 0.08%, B: 0.007 to 0.015%, N: 0.005 to 0.020%, Al: 0.03% or less, O: 0.02% or less, Cu: 0 to 1%, Ti: 0 to 0.3%, Ca: 0 to 0.05%, Mg: 0 to 0.05%, and rare earth metals: 0 to 0.1%, with the balance being Fe and impurities, and has a chemical composition satisfying Formula (1):

$$0.5 \leq Cr+6Si+1.5W+11V+5Nb+10B-40C-30N-4Ni-2Co-2Mn \leq 10.0 \quad (1)$$

where, symbols of elements in Formula (1) are to be substituted by contents of corresponding elements (in mass percent).

The chemical composition of the above welding material may contain one or more types of elements selected from a first group to a third group.

First group: Cu: 0.05 to 1.00%,

Second group: Ti: 0.02 to 0.30%, and

Third group: Ca: 0.001 to 0.050%, Mg: 0.001 to 0.050%, and rare earth metals: 0.001 to 0.10% or less An area fraction of δ ferrite in the above welding material is preferably 0.5% or less.

A welded joint according to the present invention includes a weld metal having the above-described chemical composition and a base material made of a ferritic heat-resistant steel. The base material has a chemical composition containing, in mass percent, Cr: 8 to 10%, Co: 2 to 4%, W: 2 to 4%, and B: 0.005 to 0.020%.

The chemical composition of the above base material may contain, in mass percent, C: 0.04 to 0.12%, Si: 0.05 to 0.60%, Mn: 0.1 to 0.8%, P: 0.02% or less, S: 0.01% or less, Co: 2 to 4%, Ni: 0 to 0.4%, Cr: 8 to 10%, W: 2 to 4%, Nb and/or Ta: 0.02 to 0.18% in total, V: 0.05 to 0.40%, B: 0.005 to 0.020%, Nd: 0.01 to 0.06%, N: 0.002 to 0.025%, Al: 0.03% or less, and O: 0.02% or less, and the balance may be Fe and impurities. The chemical composition of the above base material may contain Ni: 0.05 to 0.4%. An area fraction of δ ferrite in the above weld metal is, for example, 0.5% or less.

A method for producing a welded joint according to the present invention includes a step of forming a weld metal by performing gas tungsten arc welding on a base material made of a ferritic heat-resistant steel with a weld heat input of 6 to 20 kJ/cm using the above-described welding material for ferritic heat-resistant steel, the ferritic heat-resistant steel having a chemical composition that contains, in mass percent, Cr: 8 to 10%, Co: 2 to 4%, W: 2 to 4%, and B: 0.005 to 0.020%, and a step of performing heat treatment on the weld metal formed on the base material at a heat treatment temperature of 740 to 780° C. for 0.5 to 4.0 hours per 25.4 mm thickness of the base material.

Description will be made below in detail about the welding material for ferritic heat-resistant steel, the welded joint, and the method for producing a welded joint according to the present invention. The sign "%" following each element means mass percent unless otherwise noted.

[Chemical Composition of Welding Material for Ferritic Heat-Resistant Steel]

The welding material for ferritic heat-resistant steel of the present embodiment contains the following elements as its chemical composition.

C: 0.06 to 0.10%

Carbon (C) inhibits production of δ ferrite in weld metal and makes a main micro-structure of the weld metal a martensitic structure. Furthermore, when the weld metal is used at high temperature, C produces its fine carbide ($M_{23}C_6$ carbide), increasing in creep strength. An excessively low C content results in failure to provide these effects. In contrast, an excessively high C content causes a large amount of coarse carbide to precipitate, resulting in a decrease in toughness of the weld metal. Therefore, a C content is 0.06 to 0.10%. A lower limit of the C content is preferably 0.07%. An upper limit of the C content is preferably 0.09%.

Si: 0.1 to 0.4%

Silicon (Si) deoxidizes steel. Furthermore, Si increases a steam oxidation resistance property of the weld metal. An excessively low Si content results in failure to provide these effects. In contrast, an excessively high Si content promotes production of δ ferrite, resulting in a decrease in toughness of the weld metal as well as decrease in creep ductility. Therefore, an Si content is 0.1 to 0.4%. A lower limit of the Si content is preferably 0.25%. An upper limit of the Si content is preferably 0.35%.

Mn: 0.3 to 0.7%

Manganese (Mn) deoxidizes steel as with Si. Furthermore, Mn promotes martensizing of a micro-structure in the weld metal. An excessively low Mn content results in failure to provide these effects. In contrast, an excessively high Mn content makes creep embrittlement more likely to occur in the weld metal. Therefore, an Mn content is 0.3 to 0.7%. A lower limit of the Mn content is preferably 0.4%. An upper limit of the Mn content is preferably 0.6%.

P: 0.01% or Less

Phosphorus (P) is an impurity. P decreases the toughness of the weld metal. Therefore, a P content is 0.01% or less. An upper limit of the P content is preferably 0.008%. The P content is preferably as low as possible. However, a lower limit of the P content is preferably 0.0005% from a viewpoint of material costs.

S: 0.003% or Less

Sulfur (S) is an impurity. S segregates in prior-austenite grain boundaries and lath interfaces in the weld metal containing B, resulting in a decrease in sticking force of grain boundaries and lath interfaces. As a result, toughness of the weld metal is decreased. Therefore, an S content is 0.003% or less. An upper limit of the S content is preferably less than 0.002%, more preferably less than 0.0015%. The S content is preferably as low as possible. However, a lower limit of the S content is preferably 0.0002% from a viewpoint of performance and material costs.

Co: 2.6 to 3.4%

Cobalt (Co) inhibits production of δ ferrite and is therefore useful in obtaining a martensitic structure. Unlike the base material, the weld metal is not subjected to thermal refining treatment, and therefore a lower limit of a Co content to provide the above effects sufficiently is 2.6%. In contrast, an excessively high Co content results in a decrease in creep strength instead, as well as decrease in creep ductility. Furthermore, Co is an expensive element, increasing material costs. Therefore, the Co content is 2.6 to 3.4%. A lower limit of the Co content is preferably 2.8%. An upper limit of the Co content is preferably 3.3%.

Ni: 0.01 to 1.10%

Nickel (Ni) inhibits production of δ ferrite and is therefore useful in obtaining a martensitic structure. Furthermore, Ni increases the toughness of the weld metal. An excessively low Ni content results in failure to provide these effects. In contrast, an excessively high Ni content results in a decrease in creep ductility. Furthermore, Ni is an expensive element, increasing material costs. Therefore, an Ni content is 0.01 to 1.10%. A lower limit of the Ni content is preferably 0.04%. An upper limit of the Ni content is preferably 1.00%.

Cr: 8.5 to 9.5%

Chromium (Cr) increases steam oxidation resistance and corrosion resistance of the weld metal. Furthermore, when the weld metal is used at high temperature, Cr precipitates in a form of its carbide, increasing the creep strength. An excessively low Cr content results in failure to provide these effects. In contrast, an excessively high Cr content leads to decrease in stability of the carbides, resulting in a decrease in creep strength. Furthermore, the excessively high Cr content promotes production of δ ferrite, resulting in a decrease in toughness. Therefore, a Cr content is 8.5 to 9.5%. A lower limit of the Cr content is preferably 8.7%. An upper limit of the Cr content is preferably 9.3%.

W: 2.5 to 3.5%

Tungsten (W) is dissolved in a matrix, or precipitates in a form of intermetallic compounds in long-term use of the weld metal, increasing creep strength of the weld metal at high temperature. An excessively low W content results in failure to provide this effect. In contrast, an excessively high W content causes a large amount of precipitates to be produced. Furthermore, the excessively high W content promotes production of δ ferrite, resulting in a decrease in toughness of the weld metal. Therefore, a W content is 2.5 to 3.5%. A lower limit of the W content is preferably 2.7%. An upper limit of the W content is preferably 3.3%.

Mo: Less than 0.01%

Molybdenum (Mo) is an impurity for the welding material according to the present invention. Mo is dissolved in the matrix, increasing creep strength of the weld metal. However, Mo is likely to coagulate, decreasing long-term stability of intermetallic compounds and carbides that contain W. Therefore, an Mo content is preferably as low as possible, which is less than 0.01%.

Nb: 0.02 to 0.08%

Niobium (Nb) precipitates in grains in a form of its fine carbo-nitride when the weld metal is used at high temperature, increasing creep strength of the weld metal. An excessively low Nb content results in failure to provide this effect. In contrast, an excessively high Nb content causes a large amount of coarse carbo-nitride to precipitate, resulting in a decrease in creep strength and creep ductility. Furthermore, the excessively high Nb content promotes production of δ ferrite, resulting in a decrease in toughness of the weld metal. Therefore, an Nb content is 0.02 to 0.08%. A lower limit of the Nb content is preferably 0.03%. An upper limit of the Nb content is preferably 0.07%.

V: 0.1 to 0.3%

Vanadium (V) precipitates in grains in a form of its fine carbo-nitride when the weld metal is used at high temperature, increasing creep strength of the weld metal, as with Nb. An excessively low V content results in failure to provide this effect. In contrast, an excessively high V content causes a large amount of coarse carbo-nitride to precipitate, resulting in a decrease in creep strength and creep ductility. Furthermore, the excessively high V content promotes production of δ ferrite, resulting in a decrease in toughness of the weld metal. Therefore, a V content is 0.1 to 0.3%. A lower limit of the V content is preferably 0.15%. An upper limit of the V content is preferably 0.25%.

Ta: 0.02 to 0.08%

Tantalum (Ta) precipitates in grains in a form of its fine carbo-nitride when the weld metal is used at high temperature, increasing creep strength of the weld metal, as with Nb and V. An excessively low Ta content results in failure to provide this effect. In contrast, an excessively high Ta content causes a large amount of coarse carbo-nitride to precipitate, resulting in a decrease in creep strength and creep ductility. Therefore, a Ta content is 0.02 to 0.08%. A lower limit of the Ta content is preferably 0.03%. An upper limit of the Ta content is preferably 0.07%.

B: 0.007 to 0.015%

Boron (B) increases hardenability and is useful in obtaining a martensitic structure in the weld metal. Furthermore, B causes a carbide to be finely dispersed in prior-austenite boundaries and martensite lath boundaries when the weld metal is used at high temperature, inhibiting a microstructure from recovering, so as to increase creep strength. An excessively low B content results in failure to provide these effects. In contrast, an excessively high B content causes rapid growth of martensite laths in martensitic transformation, increasing a fracture unit area. Furthermore, the excessively high B content promotes production of δ ferrite. As a result, the toughness of the weld metal is extremely decreased. Therefore, a B content is 0.007 to 0.015%. A lower limit of the B content is preferably 0.009%. An upper limit of the B content is preferably 0.012%.

N: 0.005 to 0.020%

Nitrogen (N) finely precipitates in grains in a form of fine nitrides when the weld metal is used at high temperature, increasing the creep strength. Furthermore, N inhibits production of δ ferrite. An excessively low N content results in failure to provide these effects. In contrast, an excessively high N content causes a coarse nitride to crystallize when the weld metal is solidified, resulting in a decrease in toughness of the weld metal. Therefore, an N content is 0.005 to 0.020%. A lower limit of the N content is preferably 0.008%. An upper limit of the N content is preferably 0.015%.

Al: 0.03% or Less

Aluminum (Al) deoxidizes steel. An excessively low Al content results in failure to provide this effect. In contrast, an excessively high Al content leads to decrease in cleanliness, resulting in a decrease in workability of the welding material and toughness of the weld metal. Furthermore, the excessively high Al content results in a decrease in creep strength of the weld metal. Therefore, an Al content is 0.03% or less. An upper limit of the Al content is preferably 0.01%. In consideration of production costs, a lower limit of the Al content is preferably 0.001%. In the present specification, the Al content means sol.Al (acid-soluble Al).

O: 0.02% or Less

Oxygen (O) is an impurity. An excessively high O content results in a decrease in workability of the welding material and toughness of the weld metal. Therefore, an O content is 0.02% or less. An upper limit of the O content is preferably 0.01%. In consideration of performance and production costs, a lower limit of the O content is preferably 0.001%.

The chemical composition of the welding material for ferritic heat-resistant steel according to the present embodiment contains the balance being Fe and impurities. Here, the impurities mean impurities that are mixed from ores and scraps used as raw material of the welding material for ferritic heat-resistant steel, a production environment, or the like, in producing the welding material for ferritic heat-resistant steel in an industrial manner, and are allowed to be mixed in the welding material for ferritic heat-resistant steel according to the present embodiment within ranges in which the impurities have no adverse effect on the welding material for ferritic heat-resistant steel according to the present embodiment.

[Optional Element]

The above-described welding material may contain one or more types of elements selected from the following first group to third group. These elements will be described in detail below.

[First Group]

Cu: 0 to 1%

Copper (Cu) is an optional element and need not be contained. When contained, Cu is useful in generating a martensitic structure. However, an excessively high Cu content results in a decrease in the creep ductility of the weld metal. Therefore, a Cu content is 0 to 1%. An upper limit of the Cu content is preferably 0.8%. A lower limit of the Cu content is preferably 0.05%, more preferably 0.2%.

[Second Group]

Ti: 0 to 0.3%

Titanium (Ti) is an optional element and need not be contained. When contained, Ti precipitates in grains in a form of its fine carbo-nitride when the welding material is used at high temperature, increasing creep strength of the weld metal, as with Nb, V, and Ta. However, an excessively high Ti content causes Ti to be crystallized in a form of its coarse nitride during welding or to precipitate in a form of its coarse nitride in a large amount when the weld metal is used at high temperature, resulting in a decrease in toughness of the weld metal. Therefore, a Ti content is 0 to 0.3%. A lower limit of the Ti content is preferably 0.02%, more preferably 0.05%.

[Third Group]

Ca: 0 to 0.05%,

Mg: 0 to 0.05%, and

Rare Earth Metals (REMs): 0 to 0.1%

Calcium (Ca), magnesium (Mg), and rare earth metals (REMs) are optional elements and need not be contained. When contained, these elements increase hot workability in producing the welding material. However, excessively high contents of these elements cause these elements to be coupled with oxygen, resulting in a decrease in cleanliness of the weld metal. In this case, hot workability of the weld metal is decreased. Therefore, a Ca content is 0 to 0.05%, an Mg content is 0 to 0.05%, and an REM content is 0 to 0.1%. Lower limits of the Ca content and the Mg content are each preferably 0.001%, more preferably 0.002%. Upper limits of the Ca content and the Mg content are each preferably 0.02%. A lower limit of the REM content is preferably 0.001%, more preferably 0.003%. An upper limit of the REM content is preferably 0.06%.

REMs in the present specification contain at least one or more types of Sc, Y, and lanthanoids (La with atomic number 57 to Lu with atomic number 71). The REM content means a total content of these elements.

[Formula (1)]

The above chemical composition further satisfies Formula (1):

$$0.5 \leq Cr+6Si+1.5W+11V+5Nb+10B-40C-30N-4Ni-2Co-2Mn \leq 10.0 \quad (1)$$

Define F1=Cr+6Si+1.5W+11V+5Nb+10B−40C−30N−4Ni−2Co−2Mn. F1 is an index of creep strength and amount of δ ferrite. Specifically, an excessively low F1 indicates that a sufficient creep strength is cannot be obtained, and creep strength is low. In contrast, an excessively high F1 indicates that production amount of δ ferrite is increased, which makes an area fraction of δ ferrite in a micro-structure of the weld metal more than 0.5%. In this case, toughness of the weld metal is decreased. Therefore, F1 is 0.5 to 10.0. A lower limit of F1 is preferably 1.0. An upper limit of the F1 is preferably 9.0.

[Welding Material]

The welding material for ferritic heat-resistant steel according to the present invention is produced by a well-known method. The welding material is machined into, for example, a filler rod, a filler wire for gas tungsten arc welding, a core wire of a welding rod for shielded metal arc welding, or the like.

[Area Fraction of δ Ferrite in Micro-Structure of Welding Material]

The micro-structure of the welding material is mainly made of a tempered martensitic structure, the area fraction of δ ferrite in the micro-structure need be 0.5% or less. When the area fraction of δ ferrite is high, that is, when the amount of δ ferrite is large, micro-structures having different deformabilities are intermixed in machining the welding material at high temperature. As a result, workability is decreased. Furthermore, by setting an area fraction of δ ferrite in a weld metal that is obtained using the welding material according to the present invention at 0.5% or less, a high toughness is obtained. An upper limit of the area fraction of δ ferrite up to which these effects are stably obtained is preferably 0.3%, more preferably 0.1%.

The area fraction of δ ferrite is measured by the following method. A cross-sectional sample is taken from any location in the welding material. A surface of the taken sample is polished. After the polishing, the polished surface of the sample is etched using the Vilella reagent. Under an optical microscope (observation magnification: 100 times, observation visual field: 650 μm×860 μm), δ ferrite on the etched surface is identified in any five visual fields. For the identification, for example, well-known image processing software is used. Etched micro-structures (martensite, δ ferrite, etc.) have different contrasts, and thus δ ferrite is identified based on the contrasts. A value obtained by dividing a total area of δ ferrite identified in the visual fields by a total area of the five visual fields (observation visual field: 650 μm×860 μm×5) is defined as an area fraction (%) of δ ferrite in the welding material.

[Welded Joint]

By performing welding on ferritic heat-resistant steel to be described later as a base material with the welding material for ferritic heat-resistant steel according to the present invention, a welded joint including the weld metal and the base material being the ferritic heat-resistant steel is produced. This welded joint has excellent creep strength and toughness. Description will be made below in detail about the base material and the weld metal of the welded joint.

[Base Material]

The base material is made of ferritic heat-resistant steel. The base material has a chemical composition containing the following elements.

Cr: 8 to 10%

Chromium (Cr) increases steam oxidation resistance and corrosion resistance of the base material at high temperature as in the weld metal. Furthermore, when the base material is used at high temperature, Cr precipitates in a form of its carbides, increasing creep strength of the base material. An excessively low Cr content results in failure to provide these effects. However, unlike the weld metal, influence of segregation during solidification is inhibited in the base material, and the base material is subjected to thermal refining treatment before used. For that reason, a Cr content lower than that of the welding material can provide the above effects. In contrast, an excessively high Cr content leads to decrease in stability of its carbide, resulting in decrease in creep strength of the base material. Therefore, a Cr content is 8 to 10%. A lower limit of the Cr content is preferably 8.5%. An upper limit of the Cr content is preferably 9.5%.

Co: 2 to 4%

Cobalt (Co) renders a micro-structure of the base material a martensitic structure, and therefore is useful in increasing creep strength. An excessively low Co content results in failure to provide this effect. However, unlike the weld metal, influence of segregation during solidification is inhibited in the base material, and the base material is subjected to thermal refining treatment before used. For that reason, a Co content lower than that of the welding material can provide the above effects. In contrast, an excessively high Co content results in a decrease in creep strength and creep ductility of the base material. Furthermore, Co is an expensive element, increasing material costs. Therefore, a Co content is 2 to 4%. A lower limit of the Co content is preferably 2.5%, and an upper limit of the Co content is preferably 3.5%.

W: 2 to 4%

Tungsten (W) is dissolved in a matrix of the base material or precipitates in its form of intermetallic compounds in long-term use of the welded joint, increasing creep strength at high temperature as in the weld metal. An excessively low W content results in failure to provide this effect. However, unlike the weld metal, influence of segregation during solidification is inhibited in the base material, and the base material is subjected to thermal refining treatment before used. For that reason, a W content lower than that of the welding material can provide the above effects. In contrast, an excessively high W content makes the above effects saturated. Therefore, a W content is W: 2 to 4%. A lower limit of the W content is preferably 2.5%. An upper limit of the W content is preferably 3.5%.

B: 0.005 to 0.020%

Boron (B) increases hardenability and is useful in obtaining a martensitic structure as in the weld metal. Furthermore, B causes carbides to be finely dispersed in prior-austenite boundaries and martensite lath boundaries when the base material is used at high temperature, inhibiting a micro-structure from recovering, so as to increase creep strength. An excessively low B content results in failure to provide this effect. However, unlike the weld metal, influence of segregation during solidification is inhibited in the base material, and the base material is subjected to thermal refining treatment before used. For that reason, a B content lower than that of the welding material can provide the above effects. In contrast, an excessively high B content results in a decrease in toughness as in the weld metal. Therefore, a B content is 0.005 to 0.020%. A lower limit of the B content is preferably 0.007%. An upper limit of the B content is preferably 0.015%.

Containing the above-described elements, the base material has a high creep strength and a high toughness within a high temperature range.

It is preferable that the chemical composition of the above base material further contains the following elements, with the balance being Fe and impurities. Here, the impurities mean impurities that are mixed from ores and scraps used as raw material of the base material, a production environment, or the like, in producing the base material in an industrial manner, and are allowed to be mixed in the base material made of ferritic heat-resistant steel according to the present embodiment within ranges in which the impurities have no adverse effect on the base material made of ferritic heat-resistant steel according to the present embodiment.

C: 0.04 to 0.12%

Carbon (C) is useful in obtaining a martensitic structure. Furthermore, when the base material is used at high temperature, C produces its fine carbides, increasing creep strength of the base material. An excessively low C content results in failure to provide these effects. However, unlike the weld metal, influence of segregation during solidification is inhibited in the base material, and the base material is subjected to thermal refining treatment before used. For that reason, a C content lower than that of the welding material can provide the above effects. In contrast, an excessively high C content makes the effect of increasing creep strength saturated. Therefore, a C content is 0.04 to 0.12%. A lower limit of the C content is preferably 0.06%. An upper limit of the C content is preferably 0.10%.

Si: 0.05 to 0.60%

Silicon (Si) deoxidizes steel. Furthermore, Si increases a steam oxidation resistance property of the base material. An excessively low Si content results in failure to provide these effects. However, unlike the weld metal, influence of segregation during solidification is inhibited in the base material, and the base material is subjected to thermal refining treatment before used. For that reason, an Si content lower than that of the welding material can provide the above effects. In contrast, an excessively high Si content results in a decrease in creep ductility and toughness of the base material. Therefore, an Si content is 0.05 to 0.60%. A lower limit of the Si content is preferably 0.10%. An upper limit of the Si content is preferably 0.40%.

Mn: 0.1 to 0.8%

Manganese (Mn) deoxidizes steel as with Si. Furthermore, Mn renders a micro-structure of the base material martensite. An excessively low Mn content results in failure to provide these effects. However, unlike the weld metal, influence of segregation during solidification is inhibited in the base material, and the base material is subjected to thermal refining treatment before used. For that reason, an Mn content lower than that of the welding material can provide the above effects. In contrast, an excessively high Mn content makes creep embrittlement more likely to occur. Therefore, an Mn content is 0.1 to 0.8%. A lower limit of the Mn content is preferably 0.2%. An upper limit of the Mn content is preferably 0.7%.

P: 0.02% or Less

Phosphorus (P) is an impurity. An excessively high P content results in a decrease in creep ductility. Therefore, a P content is 0.02% or less. An upper limit of the P content is preferably 0.018%. The P content is preferably as low as possible. However, a lower limit of the P content is preferably 0.0005% in consideration of material costs.

S: 0.01% or Less

Sulfur (S) is an impurity. An excessively high S content results in a decrease in creep ductility. Therefore, an S content is 0.01% or less. An upper limit of the S content is preferably 0.005%. The S content is preferably as low as possible. However, a lower limit of the S content is preferably 0.0002% in consideration of material costs.

Nb and/or Ta: 0.02 to 0.18% in Total

Niobium (Nb) and tantalum (Ta) precipitates in grains in a form of their fine carbo-nitrides when the base material is used at high temperature, increasing the creep strength as in the weld metal. An excessively low Nb and/or Ta content results in failure to provide this effect. However, unlike the weld metal, influence of segregation during solidification is inhibited in the base material, and the base material is subjected to thermal refining treatment before used. For that reason, their contents lower than that of the welding material can provide the above effects. In contrast, an excessively high Nb and/or Ta content causes a large amount of coarse carbo-nitrides to precipitate, resulting in a decrease in creep strength and creep ductility. Therefore, an Nb and/or Ta content is 0.02 to 0.18% in total. A lower limit of a total Nb and/or Ta content is preferably 0.05%. An upper limit of the total Nb and/or Ta content is preferably 0.12%.

V: 0.05 to 0.40%

Vanadium (V) precipitates in grains in a form of fine carbo-nitrides when the base material is used at high temperature, increasing the creep strength, as with Nb and Ta. An excessively low V content results in failure to provide this effect. However, unlike the weld metal, influence of segregation during solidification is inhibited in the base material, and the base material is subjected to thermal refining treatment before used. For that reason, a V content lower than that of the welding material can provide the above effects. In contrast, an excessively high V content causes a large amount of coarse carbo-nitrides to precipitate, resulting in a decrease in creep strength and creep ductility. Therefore, a V content is 0.05 to 0.40%. A lower limit of the V content is preferably 0.10%. An upper limit of the V content is preferably 0.30%.

Nd: 0.01 to 0.06%

Neodymium (Nd) improves creep ductility of the base material. An excessively low Nd content results in failure to provide this effect. In a base material that causes no concern for being reduced in a form of slag during welding, the above effect of Nd can be used effectively. In contrast, an excessively high Nd content results in a decrease in hot workability. Therefore, an Nd content is 0.01 to 0.06%. A lower limit of the Nd content is preferably 0.02%. An upper limit of the Nd content is preferably 0.05%.

N: 0.002 to 0.025%

Nitrogen (N) finely precipitates in grains in a form of fine nitrides when the base metal is used at high temperature, increasing the creep strength. An excessively low N content results in failure to provide this effect. However, unlike weld metal, influence of segregation during solidification is inhibited in the base material, and the base material is subjected to thermal refining treatment before used. For that reason, an N content lower than that of the welding material can provide the above effects. In contrast, an excessively high N content causes the nitrides to coarsen, resulting in a decrease in creep ductility. Therefore, an N content is 0.002 to 0.025%. A lower limit of the N content is preferably 0.005%. An upper limit of the N content is preferably 0.015%.

Al: 0.03% or Less

Aluminum (Al) deoxidizes steel as in the welding material. However, an excessively high Al content leads to a decrease in cleanliness of the base material, resulting in a decrease in workability. Furthermore, the excessively high Al content results in a decrease in creep strength. Therefore, an Al content is 0.03% or less. An upper limit of the Al content is preferably 0.01%. In consideration of production costs, a lower limit of the Al content is preferably 0.001%. In the present specification, the Al content means sol.Al (acid-soluble Al).

O: 0.02% or Less

Oxygen (O) is an impurity as in the welding material. An excessively high O content results in a decrease in workability of the base material. Therefore, an O content is 0.02% or less. An upper limit of the O content is preferably 0.01%. In consideration of material costs, a lower limit of the O content is preferably 0.001%.

The above-described base material may further contain Ni partially in lieu of Fe.

Ni: 0 to 0.4%

Nickel (Ni) is an optional element and need not be contained. When contained, Ni is useful in obtaining a martensitic structure. However, an excessively high Ni content makes the above effect saturated. Therefore, an Ni content is 0 to 0.4%. An upper limit of the Ni content is preferably 0.2%. A lower limit of the Ni content is preferably 0.05%, more preferably 0.1%.

The base material having the above chemical composition has an excellent ductility and an excellent creep strength even in a high temperature range of 700° C. or more.

[Weld Metal]

A weld metal is formed by performing welding using the above-described welding material for ferritic heat-resistant steel by a method to be described later. A weld metal according to the present invention has an excellent creep strength and an excellent toughness. In any region of the weld metal, a chemical composition of the weld metal contains elements of which contents are within ranges of respective element contents in the description of the chemical composition of the above-described welding material for ferritic heat-resistant steel.

[Micro-Structure of Weld Metal]

A micro-structure of the weld metal after welding is mainly made up of martensite. An area fraction of δ ferrite in the micro-structures of the weld metal has to be 0.5% or less. When the area fraction of δ ferrite is high, that is, when the amount of δ ferrite is large, starting points of crack occurrence are increased, resulting in a decrease in toughness. The area fraction of δ ferrite in the micro-structures of the weld metal according to the present invention is as low as 0.5% or less. Therefore, the weld metal has a high toughness. An upper limit of the area fraction of δ ferrite is preferably 0.3%, more preferably 0.1%.

The area fraction of δ ferrite is measured by the following method. A sample is taken from any location in the weld metal. A surface of the taken sample is polished. After the polishing, the polished surface of the sample is etched using the Vilella reagent. Under an optical microscope (observation magnification: 100 times, observation visual field: 650 μm×860 μm), δ ferrite on the etched surface is identified in any five visual fields. For the identification, for example, well-known image processing software is used. Etched micro-structures (martensite, δ ferrite, etc.) have different contrasts, and thus δ ferrite is identified based on the contrasts. A value obtained by dividing a total area of δ ferrite identified in the visual fields by a total area of the five visual fields (observation visual field: 650 μm×860×5) is defined as an area fraction (%) of δ ferrite in the weld metal.

[Method for Producing Welded Joint]

A method for producing the above-described welded joint includes a step of performing welding on the above base material using the above welding material for ferritic heat-resistant steel (welding step), and a step of performing heat treatment on the weld metal (heat treatment step). Each of the steps will be described below in detail.

[Welding Step]

Welding is performed on the above-described base material to form weld metal. The base material is not limited to a particular shape. The base material may be a steel plate or a steel pipe.

For the welding, the above-described welding material for ferritic heat-resistant steel is used. As a welding method, gas tungsten arc welding is preferably employed. This is because the gas tungsten arc welding causes less mixing of oxygen during the welding, which inhibits decrease in cleanliness of the weld metal. Welding conditions for the gas tungsten arc welding are as follows.

Weld Heat Input Range: 6 to 20 kJ/Cm

In the gas tungsten arc welding, an excessively low weld heat input makes lack of fusion likely to occur depending on a shape and dimensions of the base material. Furthermore, the excessively low weld heat input makes a cooling rate excessively high, promoting growth of martensite laths. In this case, a fracture unit area is increased, resulting in a decrease in toughness of the weld metal. In contrast, an excessively high weld heat input causes solidification cracking to occur in the weld metal according to the present invention, which contains B. Therefore, the weld heat input is 6 to 20 kJ/em. A lower limit of the weld heat input is preferably 8 kJ/cm. An upper limit of the weld heat input is preferably 18 kJ/cm. A weld heat input range satisfying this condition is likely to provide an excellent toughness.

[Heat Treatment Step]

After the welding step, heat treatment is performed on the weld metal Through the heat treatment, the weld metal comes to have a decreased hardness and an increased toughness. For example, the heat treatment is performed with a heat treatment device such as a band heater and an induction heater disposed over a weldment including a weld metal portion. Alternatively, an entire welding structure is heated in a reheating furnace. In the heat treatment, a heat treatment temperature and a retention duration (heat treatment duration) at the heat treatment temperature are as follows.

Heat Treatment Temperature: 740 to 780° C.

Heat Treatment Duration: 0.5 to 4.0 Hours Per 25.4 mm Thickness of Base Material A unit thickness of the base material is set at 25.4 mm (1 inch) which is often specified a standard practice for welding or the like. An excessively low heat treatment temperature or an excessively short heat treatment duration per unit thickness of the base material makes tempering of a martensitic structure insufficient, resulting in failure to obtain a sufficient toughness. In contrast, at an excessively high heat treatment temperature, a portion of the weld metal exceeds an austenite transformation temperature, resulting in a decrease in toughness. With an excessively long heat treatment duration per unit thickness of the base material, the tempering becomes excessive, resulting in a decrease in creep strength. Therefore, a heat treatment temperature is 740 to 780° C., and a heat treatment duration is 0.5 to 4.0 hours per 25.4 mm thickness of the base material. Here, thickness of the base material is plate thickness in a case where the base material is a steel plate, or a wall thickness in a case where the base material is a steel pipe. A lower limit of the heat treatment duration is preferably 1.0 hour per 25.4 mm thickness of the base material, and an upper limit of the heat treatment duration is preferably 3.0 hours. A heat treatment temperature and a heat treatment duration satisfying these conditions allow a creep rupture time of, for example, deposit metal produced using the above-described welding material for ferritic heat-resistant steel to be made 3000 hours or more, and is likely to provide an excellent toughness.

EXAMPLES

Welded joints were produced according to various chemical compositions and production conditions, and creep strength and toughness were evaluated.

[Producing Base Material]

Molten steels having chemical compositions shown in Table 1 were produced. Using the molten steels, ingots were produced.

TABLE 1

| | Chemical composition (mass %, balance: Fe and impurities) | | | | | | | | | | | | | | | |
|---|---|---|---|---|---|---|---|---|---|---|---|---|---|---|---|---|
| Sign | C | Si | Mn | P | S | Cr | Co | Ni | W | Nb + Ta | V | B | Nd | Al | N | O |
| 1 | 0.08 | 0.31 | 0.48 | 0.018 | 0.0002 | 9.1 | 3.1 | – | 3.0 | 0.11 | 0.20 | 0.011 | 0.039 | 0.012 | 0.011 | 0.009 |
| 2 | 0.09 | 0.25 | 0.50 | 0.015 | 0.0005 | 8.9 | 2.9 | 0.2 | 2.7 | 0.08 | 0.18 | 0.008 | 0.026 | 0.009 | 0.009 | 0.008 |
| 3 | 0.08 | 0.28 | 0.47 | 0.016 | 0.0003 | 9.0 | 2.7 | – | 2.8 | 0.09 | 0.19 | 0.002 | 0.030 | 0.011 | 0.009 | 0.008 |

The ingots were subjected to hot forging and hot rolling to be produced into steel plates. The steel plates were subjected to quenching and tempering to be produced into base material steel plates (hereafter, simply referred to as base materials) each having a plate thickness of 12 mm, a width of 50 mm, and a length of 200 mm. In the quenching, the steel plates were retained at 1100° C. for 1 hour and thereafter subjected to air cooling (air cooling quenching). In the tempering, the quenched steel plates were retained at 770° C. for 1.5 hours.

[Producing Welding Material]

Molten steels having chemical compositions shown in Table 2 were produced, and using the molten steels, ingots were produced. The ingots were subjected to hot forging, hot rolling, and machine work to be produced into filler wires each having a diameter of 2.4 mm. The produced filler wires were used as welding materials.

TABLE 2

| | Chemical composition (mass %, balance: Fe and impurities) | | | | | | | | | | | | |
|---|---|---|---|---|---|---|---|---|---|---|---|---|---|
| Sign | C | Si | Mn | P | S | Cr | Co | Ni | W | V | Nb | Ta | Al |
| A | 0.08 | 0.33 | 0.53 | 0.006 | 0.0008 | 8.9 | 2.9 | 0.40 | 3.0 | 0.19 | 0.05 | 0.04 | 0.009 |
| B | 0.07 | 0.35 | 0.48 | 0.005 | 0.0014 | 9.0 | 3.1 | 0.50 | 3.1 | 0.20 | 0.06 | 0.05 | 0.008 |
| C | 0.08 | 0.30 | 0.60 | 0.007 | 0.0013 | 9.1 | 3.2 | 0.81 | 2.7 | 0.16 | 0.07 | 0.03 | 0.007 |
| D | 0.09 | 0.25 | 0.55 | 0.008 | 0.0012 | 8.7 | 2.7 | 0.09 | 3.2 | 0.24 | 0.04 | 0.05 | 0.010 |
| E | 0.06 | 0.28 | 0.41 | 0.006 | 0.0011 | 9.3 | 3.0 | 0.05 | 3.3 | 0.21 | 0.04 | 0.07 | 0.009 |
| F | 0.08 | 0.30 | 0.51 | 0.008 | 0.0014 | 9.1 | 2.6 | 0.40 | 2.8 | 0.25 | 0.05 | 0.04 | 0.011 |
| G | 0.06 | 0.29 | 0.48 | 0.009 | 0.0027 | 9.3 | 2.6 | 0.10 | 3.4 | 0.18 | 0.04 | 0.06 | 0.009 |
| H | 0.10 | 0.34 | 0.44 | 0.008 | 0.0010 | 9.0 | 3.1 | 0.20 | 2.9 | 0.20 | 0.06 | 0.05 | 0.012 |
| I | 0.07 | 0.35 | 0.41 | 0.006 | 0.0011 | 9.4 | 2.7 | 0.06 | 3.4 | 0.25 | 0.06 | 0.05 | 0.009 |
| J | 0.09 | 0.12 | 0.68 | 0.008 | 0.0012 | 8.5 | 3.3 | 1.00 | 3.4 | 0.14 | 0.04 | 0.05 | 0.010 |

| | Chemical composition (mass %, balance: Fe and impurities) | | | | | δ ferrite amount area fraction (%) |
|---|---|---|---|---|---|---|
| Sign | N | B | O | Other elements | F1 | |
| A | 0.010 | 0.009 | 0.005 | Mo: 0.008 | 5.9 | 0 |
| B | 0.012 | 0.010 | 0.006 | — | 5.9 | 0 |

TABLE 2-continued

| | | | | | | |
|---|---|---|---|---|---|---|
| C | 0.008 | 0.012 | 0.004 | Cu: 0.08, REM: 0.012 | 2.9 | 0 |
| D | 0.009 | 0.010 | 0.004 | Ti: 0.11, Ca: 0.002, Mo: 0.005 | 7.2 | 0.02 |
| E | 0.015 | 0.015 | 0.005 | Mg: 0.003 | 8.7 | 0.07 |
| F | 0.009 | 0.007 | 0.007 | Mo: 0.009 | 6.9 | 0 |
| G | 0.012 | 0.006 | 0.004 | — | 9.1 | 0.12 |
| H | 0.010 | 0.017 | 0.006 | — | 5.9 | 0 |
| I | 0.008 | 0.011 | 0.006 | REM: 0.008 | 10.3 | 0.51 |
| J | 0.009 | 0.009 | 0.006 | Ti: 0.05 | 0.3 | 0 |

[Area Fraction of δ Ferrite of Welding Material]

From the above-described filler wires, cross-sectional micro specimens were taken. These micro specimens were polished and etched by the same method as that for the above-described area fraction of δ ferrite amount of the welding material, so that micro-structures were exposed. Any five visual fields were observed with a magnification of 100 times, and the area fraction of δ ferrite was determined.

[Producing Welded Joint]

On the above base material, a V-type groove with an angle of 30° and a root thickness of 1 mm was machined in a longitudinal direction of each base material. V-type grooves of a pair of base materials were butted together and subjected to welding using the above-described welding material. Specifically, the welding material was used in multi-pass weld in a bevel to form weld metal by the gas tungsten arc welding using Ar as shielding gas, so as to be produced into a welded joint of each test number shown in Table 3. Heat inputs of root pass welding and heat inputs of the multi-pass weld during welding were as shown in Table 3.

TABLE 3

| Test number | Sign | Welding material | Base material | Weld heat input (kJ/cm) Root pass | Weld heat input (kJ/cm) Multi pass | Heat treatment conditions after welding | Creep rupture test rupture position of welded joint | Creep rupture test rupture time of all-deposit metal (hour) | Creep strength determination |
|---|---|---|---|---|---|---|---|---|---|
| 1 | A-1 | A | 1 | 6 | 15 | 760° C. × 0.5 h | HAZ | 11557.1 | Good |
| 2 | A-2 | A | 1 | 6 | 12 | 760° C. × 0.5 h | HAZ | 12123.7 | Good |
| 3 | A-3 | A | 1 | 6 | 15 | 760° C. × 1.5 h | HAZ | 9768.3 | Good |
| 4 | A-4 | A | 1 | 6 | 15 | 760° C. × 2.0 h | HAZ | 7765.7 | Good |
| 5 | A-5 | A | 1 | 6 | 15 | 740° C. × 0.5 h | HAZ | 12034.5 | Good |
| 6 | A-6 | A | 1 | 6 | 15 | 750° C. × 0.5 h | HAZ | 11786.3 | Good |
| 7 | A-7 | A | 1 | 6 | 15 | 770° C. × 0.5 h | HAZ | 10043.0 | Good |
| 8 | A-8 | A | 1 | 6 | 15 | 780° C. × 0.5 h | HAZ | 9821.3 | Good |
| 9 | A-9 | A | 1 | 6 | 18 | 760° C. × 0.5 h | HAZ | 9789.3 | Good |
| 10 | A-10 | A | 1 | 6 | 20 | 760° C. × 0.5 h | HAZ | 8876.4 | Good |
| 11 | A-11 | A | 2 | 6 | 15 | 760° C. × 0.5 h | HAZ | 10273.5 | Good |
| 12 | A-12 | A | 1 | 4 | 4 | 760° C. × 0.5 h | HAZ | 12567.7 | Good |
| 13 | A-13 | A | 1 | 6 | 25 | 760° C. × 0.5 h | Test was not conducted due to solidification cracking occurrence | | |
| 14 | A-14 | A | 1 | 6 | 15 | 720° C. × 0.5 h | HAZ | 10685.5 | Good |
| 15 | A-15 | A | 1 | 6 | 15 | 800° C. × 0.5 h | HAZ | 5254.7 | Good |
| 16 | B-1 | B | 1 | 6 | 15 | 760° C. × 0.5 h | HAZ | 9626.5 | Good |
| 17 | B-2 | B | 2 | 6 | 15 | 760° C. × 0.5 h | HAZ | 9874.3 | Good |
| 18 | C-1 | C | 1 | 6 | 15 | 760° C. × 0.5 h | HAZ | 7881.9 | Good |
| 19 | D-1 | D | 1 | 6 | 15 | 760° C. × 0.5 h | HAZ | 8231.3 | Good |
| 20 | E-1 | E | 1 | 6 | 15 | 760° C. × 0.5 h | HAZ | 11687.3 | Good |
| 21 | F-1 | F | 1 | 6 | 15 | 760° C. × 0.1 h | HAZ | 6235.3 | Good |
| 22 | F-2 | F | 1 | 6 | 15 | 760° C. × 0.5 h | HAZ | 3843.5 | Acceptable |
| 23 | F-3 | F | 1 | 6 | 15 | 760° C. × 2.5 h | Weld metal | 2432.5 | Poor |
| 24 | G-1 | G | 1 | 6 | 15 | 760° C. × 0.5 h | HAZ | 2656.5 | Poor |
| 25 | H-1 | H | 1 | 6 | 15 | 760° C. × 0.5 h | HAZ | 11874.5 | Good |
| 26 | I-1 | I | 1 | 6 | 15 | 760° C. × 0.5 h | HAZ | 9892.3 | Good |
| 27 | J-1 | J | 1 | 6 | 15 | 760° C. × 0.5 h | Weld metal | 2965.3 | Poor |
| 28 | F-4 | F | 3 | 6 | 15 | 760° C. × 0.5 h | Weld metal | 3505.5 | Poor |

| Test number | Charpy impact test individual value <average value> (J) | Toughness determination | δ ferrite amount area fraction (%) |
|---|---|---|---|
| 1 | 44, 52, 38 <45> | Good | 0 |
| 2 | 40, 44, 40 <41> | Good | 0.03 |
| 3 | 56, 42, 42 <47> | Good | 0 |
| 4 | 58, 45, 56 <53> | Good | 0 |
| 5 | 40, 32, 36 <36> | Good | 0 |
| 6 | 50, 32, 30 <37> | Good | 0 |
| 7 | 54, 44, 42 <47> | Good | 0 |
| 8 | 56, 52, 48 <52> | Good | 0 |
| 9 | 50, 40, 48 <46> | Good | 0 |
| 10 | 55, 52, 56 <54> | Good | 0 |
| 11 | 50, 42, 44 <45> | Good | 0 |
| 12 | 11, 8, 10 <10> | Poor | 0 |

TABLE 3-continued

| | | |
|---|---|---|
| 13 | Test was not conducted due to solidification cracking occurrence | |
| 14 | 21, 16, 18 <18> Poor | 0 |
| 15 | 8, 6, 4 <6> Poor | 0 |
| 16 | 43, 45, 40 <43> Good | 0.02 |
| 17 | 50, 52, 46 <49> Good | 0 |
| 18 | 52, 60, 55 <56> Good | 0 |
| 19 | 44, 42, 40 <42> Good | 0.09 |
| 20 | 28, 38, 25 <30> Acceptable | 0.30 |
| 21 | 20, 19, 26 <17> Poor | 0 |
| 22 | 68, 68, 63 <66> Good | 0 |
| 23 | 104, 92, 106 <101> Good | 0.03 |
| 24 | 26, 35, 28 <30> Acceptable | 0.41 |
| 25 | 11, 17, 20 <16> Poor | 0 |
| 26 | 16, 24, 22 <21> Poor | 0.65 |
| 27 | 52, 48, 60 <53> Good | 0 |
| 28 | 48, 48, 54 <50> Good | 0.04 |

A composition of a weld metal of the resultant welded joint was measured. A method for measuring an element composition of the weld metal was as follows. A machined chip specimen was taken in such a manner that base material is not mixed in from the weld metal 1. The taken machined chip was analyzed by means of the inductively coupled plasma optical emission spectrometry, the high frequency combustion, and the like. Resultant element compositions of weld metals are shown in Table 4 and Table 5. REM contents in Table 5 each indicate a total content of REMs except Nd.

TABLE 4

| Test number | Sign | Welding material | Base material | Chemical composition (mass %, balance: Fe and impurities) | | | | | | | | |
|---|---|---|---|---|---|---|---|---|---|---|---|---|
| | | | | C | Si | Mn | P | S | Cr | Co | Ni | W |
| 1 | A-1 | A | 1 | 0.08 | 0.33 | 0.52 | 0.008 | 0.0007 | 8.9 | 3.0 | 0.32 | 3.0 |
| 2 | A-2 | A | 1 | 0.08 | 0.33 | 0.52 | 0.008 | 0.0007 | 8.9 | 3.0 | 0.34 | 3.0 |
| 3 | A-3 | A | 1 | 0.08 | 0.33 | 0.52 | 0.008 | 0.0007 | 8.9 | 3.0 | 0.32 | 3.0 |
| 4 | A-4 | A | 1 | 0.08 | 0.33 | 0.52 | 0.008 | 0.0007 | 8.9 | 3.0 | 0.34 | 3.0 |
| 5 | A-5 | A | 1 | 0.08 | 0.33 | 0.52 | 0.009 | 0.0007 | 8.9 | 3.0 | 0.33 | 3.0 |
| 6 | A-6 | A | 1 | 0.08 | 0.33 | 0.52 | 0.008 | 0.0007 | 8.9 | 3.0 | 0.31 | 3.0 |
| 7 | A-7 | A | 1 | 0.08 | 0.33 | 0.52 | 0.008 | 0.0007 | 8.9 | 3.0 | 0.34 | 3.0 |
| 8 | A-8 | A | 1 | 0.08 | 0.33 | 0.52 | 0.008 | 0.0007 | 8.9 | 3.0 | 0.34 | 3.0 |
| 9 | A-9 | A | 1 | 0.08 | 0.32 | 0.52 | 0.008 | 0.0007 | 9.0 | 3.0 | 0.29 | 3.0 |
| 10 | A-10 | A | 1 | 0.08 | 0.32 | 0.52 | 0.010 | 0.0006 | 9.0 | 3.0 | 0.26 | 3.0 |
| 11 | A-11 | A | 2 | 0.08 | 0.31 | 0.52 | 0.008 | 0.0007 | 8.9 | 2.9 | 0.35 | 2.9 |
| 12 | A-12 | A | 1 | 0.08 | 0.33 | 0.52 | 0.008 | 0.0007 | 8.9 | 2.9 | 0.36 | 3.0 |
| 13 | A-13 | A | 1 | 0.08 | 0.32 | 0.51 | 0.009 | 0.0006 | 9.0 | 3.0 | 0.27 | 3.0 |
| 14 | A-14 | A | 1 | 0.08 | 0.33 | 0.52 | 0.008 | 0.0007 | 8.9 | 2.9 | 0.32 | 3.0 |
| 15 | A-15 | A | 1 | 0.08 | 0.33 | 0.52 | 0.009 | 0.0007 | 8.9 | 3.0 | 0.33 | 3.0 |
| 16 | B-1 | B | 1 | 0.07 | 0.34 | 0.48 | 0.007 | 0.0012 | 9.0 | 3.1 | 0.41 | 3.0 |
| 17 | B-2 | B | 2 | 0.07 | 0.33 | 0.48 | 0.007 | 0.0012 | 9.0 | 3.1 | 0.42 | 3.0 |
| 18 | C-1 | C | 1 | 0.08 | 0.30 | 0.58 | 0.009 | 0.0011 | 9.1 | 3.2 | 0.68 | 2.8 |
| 19 | D-1 | D | 1 | 0.09 | 0.26 | 0.53 | 0.010 | 0.0010 | 8.8 | 2.8 | 0.08 | 3.2 |
| 20 | E-1 | E | 1 | 0.06 | 0.29 | 0.43 | 0.008 | 0.0009 | 9.3 | 3.0 | 0.04 | 3.2 |
| 21 | F-1 | F | 1 | 0.08 | 0.30 | 0.50 | 0.010 | 0.0012 | 9.1 | 2.7 | 0.34 | 2.8 |
| 22 | F-2 | F | 1 | 0.08 | 0.30 | 0.50 | 0.010 | 0.0011 | 9.1 | 2.7 | 0.33 | 2.8 |
| 23 | F-3 | F | 1 | 0.08 | 0.30 | 0.50 | 0.010 | 0.0012 | 9.1 | 2.7 | 0.32 | 2.8 |
| 24 | G-1 | G | 1 | 0.06 | 0.29 | 0.48 | 0.010 | 0.0022 | 9.3 | 2.7 | 0.08 | 3.3 |
| 25 | H-1 | H | 1 | 0.10 | 0.33 | 0.45 | 0.010 | 0.0008 | 9.0 | 3.1 | 0.17 | 2.9 |
| 26 | I-1 | I | 1 | 0.07 | 0.34 | 0.43 | 0.008 | 0.0010 | 9.3 | 2.8 | 0.05 | 3.3 |
| 27 | J-1 | J | 1 | 0.09 | 0.15 | 0.64 | 0.010 | 0.0010 | 8.6 | 3.3 | 0.80 | 3.3 |
| 28 | F-4 | F | 3 | 0.08 | 0.30 | 0.50 | 0.009 | 0.0012 | 9.1 | 2.6 | 0.34 | 2.8 |

TABLE 5

| Test number | Sign | Welding material | Base material | V | Nb | Ta | Al | N | B | O | Nd | Other elements |
|---|---|---|---|---|---|---|---|---|---|---|---|---|
| | | | | | | | | | | | | Chemical composition (mass %, balance: Fe and impurities) |
| 1 | A-1 | A | 1 | 0.19 | 0.06 | 0.04 | 0.010 | 0.010 | 0.009 | 0.006 | 0.008 | Mo: 0.006 |
| 2 | A-2 | A | 1 | 0.19 | 0.06 | 0.04 | 0.009 | 0.010 | 0.009 | 0.005 | 0.006 | Mo: 0.007 |
| 3 | A-3 | A | 1 | 0.19 | 0.06 | 0.04 | 0.010 | 0.010 | 0.009 | 0.006 | 0.008 | Mo: 0.006 |
| 4 | A-4 | A | 1 | 0.19 | 0.06 | 0.04 | 0.009 | 0.010 | 0.009 | 0.006 | 0.006 | Mo: 0.005 |
| 5 | A-5 | A | 1 | 0.19 | 0.06 | 0.04 | 0.009 | 0.010 | 0.009 | 0.006 | 0.007 | Mo: 0.006 |
| 6 | A-6 | A | 1 | 0.19 | 0.06 | 0.04 | 0.010 | 0.010 | 0.009 | 0.006 | 0.009 | Mo: 0.006 |
| 7 | A-7 | A | 1 | 0.19 | 0.06 | 0.04 | 0.009 | 0.010 | 0.009 | 0.006 | 0.006 | Mo: 0.005 |
| 8 | A-8 | A | 1 | 0.19 | 0.06 | 0.04 | 0.010 | 0.010 | 0.009 | 0.006 | 0.006 | Mo: 0.006 |
| 9 | A-9 | A | 1 | 0.19 | 0.06 | 0.04 | 0.010 | 0.010 | 0.009 | 0.006 | 0.011 | Mo: 0.006 |
| 10 | A-10 | A | 1 | 0.19 | 0.06 | 0.03 | 0.010 | 0.010 | 0.009 | 0.006 | 0.014 | Mo: 0.005 |
| 11 | A-11 | A | 2 | 0.19 | 0.07 | 0.04 | 0.009 | 0.010 | 0.009 | 0.006 | 0.005 | Mo: 0.006 |
| 12 | A-12 | A | 1 | 0.19 | 0.06 | 0.04 | 0.009 | 0.010 | 0.009 | 0.006 | 0.003 | Mo: 0.007 |
| 13 | A-13 | A | 1 | 0.19 | 0.06 | 0.03 | 0.010 | 0.010 | 0.010 | 0.006 | 0.013 | Mo: 0.004 |
| 14 | A-14 | A | 1 | 0.19 | 0.06 | 0.04 | 0.009 | 0.010 | 0.009 | 0.006 | 0.007 | Mo: 0.006 |
| 15 | A-15 | A | 1 | 0.19 | 0.05 | 0.04 | 0.010 | 0.010 | 0.009 | 0.006 | 0.007 | Mo: 0.005 |
| 16 | B-1 | B | 1 | 0.20 | 0.07 | 0.04 | 0.009 | 0.012 | 0.010 | 0.007 | 0.007 | — |
| 17 | B-2 | B | 2 | 0.20 | 0.08 | 0.04 | 0.008 | 0.011 | 0.010 | 0.006 | 0.006 | — |
| 18 | C-1 | C | 1 | 0.17 | 0.07 | 0.03 | 0.008 | 0.009 | 0.012 | 0.005 | 0.006 | Cu: 0.06, REM: 0.010 |
| 19 | D-1 | D | 1 | 0.23 | 0.05 | 0.04 | 0.010 | 0.009 | 0.010 | 0.005 | 0.006 | Ti: 0.08, Ca: 0.001, Mo: 0.004 |
| 20 | E-1 | E | 1 | 0.21 | 0.05 | 0.06 | 0.009 | 0.014 | 0.014 | 0.006 | 0.006 | Mg: 0.001 |
| 21 | F-1 | F | 1 | 0.24 | 0.06 | 0.04 | 0.011 | 0.009 | 0.008 | 0.007 | 0.006 | Mo: 0.007 |
| 22 | F-2 | F | 1 | 0.24 | 0.06 | 0.04 | 0.011 | 0.009 | 0.008 | 0.007 | 0.007 | Mo: 0.007 |
| 23 | F-3 | F | 1 | 0.24 | 0.06 | 0.04 | 0.011 | 0.009 | 0.008 | 0.007 | 0.008 | Mo: 0.006 |
| 24 | G-1 | G | 1 | 0.18 | 0.05 | 0.05 | 0.009 | 0.012 | 0.008 | 0.005 | 0.007 | — |
| 25 | H-1 | H | 1 | 0.20 | 0.06 | 0.04 | 0.012 | 0.010 | 0.016 | 0.007 | 0.006 | — |
| 26 | I-1 | I | 1 | 0.24 | 0.07 | 0.04 | 0.010 | 0.009 | 0.011 | 0.007 | 0.009 | REM: 0.004 |
| 27 | J-1 | J | 1 | 0.15 | 0.05 | 0.04 | 0.010 | 0.009 | 0.009 | 0.007 | 0.008 | Ti: 0.02 |
| 28 | F-4 | F | 3 | 0.24 | 0.07 | 0.04 | 0.011 | 0.009 | 0.006 | 0.007 | 0.005 | Mo: 0.005 |

A welded joint was subjected to heat treatment at heat treatment temperatures for heat treatment durations shown in Table 3. Specifically, the welded joint was retained at the heat treatment temperatures for the heat treatment durations shown in Table 3, and is thereafter subjected to air cooling.

[Producing All-Deposit Metal]

Aside from the above welded joint, in each test number, multi-layer welding was performed on a plate material of a base material shown in Table 3 using a welding material shown in Table 3 by means of the gas tungsten arc welding using Ar as shielding gas with a multi-pass weld heat input shown in Table 3 until multi-layer welds come to have a thickness of 12 mm. By this multi-layer welding, all-deposit metal was fabricated.

The produced all-deposit metal was subjected to heat treatment in heat treatment conditions shown in Table 3.

[Test for Evaluating Creep Strength]

From the produced welded joint, a round bar creep rupture specimen was taken so that weld metal lies in a center of a parallel portion (called a welded joint specimen). In addition, another round bar creep rupture specimen was taken from the all-deposit metal (called an all-deposit specimen). As to the specimens, the round bar creep rupture specimens of the welded joint and the all-deposit metal was subjected to a creep rupture test in test conditions of 650° C. and 147 MPa under which a target creep rupture time of the base material is about 3000 hours. From results of the test, creep strength determination was conducted with the following evaluation. When the welded joint specimen was ruptured in the base material (HAZ), and a creep rupture time of the all-deposit specimen was 5000 hours or more, was determined to be "GOOD". When the welded joint specimen was ruptured in the base material (HAZ), and the creep rupture time of the all-deposit specimen is 3000 hours or more and less than 5000 hours, the test number was determined to be "ACCEPTABLE". When the welded joint specimen was ruptured in the weld metal portion, or the creep rupture time of the all-deposit specimen fell below 3000 hours, the test number was determined to be "POOR".

[Charpy Impact Test]

From the above-described welded joint, by machining a notch on the weld metal, three full-sized V-notched Charpy impact specimens (notch depth: 2 mm) were taken. The specimens were each subjected to the Charpy impact test in conformity with JIS Z2242 (2005) at 0° C. Based on results of the test, toughness determination was conducted as follows. When Charpy impact test individual values of the three specimens were all more than 27 J, the test number was determined to be "GOOD", when an average value of the Charpy impact test individual values of the three specimens satisfied 27 J although a Charpy impact test individual value of one of the three specimens fell below 27 J, the test number was determined to be "ACCEPTABLE", and when the average value of the Charpy impact test individual values of the three specimens fell below 27 J, the test number was determined to be "POOR".

[Area Fraction of δ Ferrite]

From the above-described all-deposit metal, a cross-sectional micro specimen was taken. The micro specimen taken from the all-deposit metal was polished and etched by the above-described method, so that micro-structures were exposed. Any five visual fields were observed with a magnification of 100 times, and the area fraction of δ ferrite was determined.

[Test Result]

Table 3 shows results of the above test together.

Referring to Table 3, the test number 1 to 11, 16 to 20, and 22 had appropriate chemical compositions and their values of F1 satisfied Formula (1). Therefore, weld metals of these test numbers exhibited excellent creep strengths and excellent toughnesses. Resultant welded joint also had sufficient creep strengths and sufficient toughnesses.

In contrast, as to the test number 12, the weld heat input was excessively low. As a result, the Charpy impact value fell below 27 J, and the toughness was determined to be poor.

The test number 13, the weld heat input was excessively high. As a result, the solidification cracking occurred. Therefore, the test was not conducted.

The test number 14, the heat treatment temperature after the welding was excessively low. As a result, the Charpy impact value fell below 27 J, and the toughness was determined to be poor.

The test number 15, the heat treatment temperature after the welding was excessively high. As a result, the Charpy impact value fell below 27 J, and the toughness was determined to be poor.

The test number 21, the heat treatment duration after the welding was excessively short. As a result, the Charpy impact value fell below 27 J, and the toughness was determined to be poor.

The test number 23, the heat treatment duration after the welding was excessively long. As a result, in the creep test of the welded joint, the welded joint specimen was ruptured in the weld metal, and the creep rupture time of the all-deposit metal failed to reach 3000 hours as the target, so that the creep strength was determined to be poor.

As to a welding material with a sign G used in a test number 24, the B content was excessively low. As a result, in the creep test of the welded joint, although the welded joint specimen was ruptured in the HAZ, the creep rupture time of the all-deposit metal failed to reach 3000 hours as the target, so that the creep strength was determined to be poor.

As to a welding material with a sign H used in a test number 25, the B content was excessively high. As a result, although the welding material was excellent in creep strength, the average Charpy impact value fell below 27 J, so that the toughness was determined to be poor.

As to a welding material with a sign I used in a test number 26, an F1 value was excessively high. As a result, δ ferrite more than 0.5% was produced in the weld metal, and thus the Charpy impact value fell below 27 J, so that the toughness was determined to be poor.

As to a welding material with a sign J used in a test number 27, an F1 value was excessively low. As a result, in the creep test of the welded joint, the welded joint specimen was ruptured in the weld metal, and the creep rupture time of the all-deposit metal failed to reach 3000 hours as the target, so that a targeted creep strength was not obtained.

As to a base material used in a test number 28, the B content contained in the base material was excessively low. As a result, although the creep rupture time of the all-deposit metal satisfied the target, a sufficient B amount was not contained in the weld metal of the welded joint as shown in the test number 28 of Table 4 and Table 5, and thus the welded joint specimen was ruptured in the weld metal, with a result that the base material was determined to be poor.

As seen from the above, it is clear that the weld metal establishes compatibility between necessary creep strength and toughness only when requirements according to the present invention are satisfied, and the resultant welded joint also has a sufficient creep strength and a sufficient toughness.

INDUSTRIAL APPLICABILITY

According to the present invention, a welding material for ferritic heat-resistant steel available in performing welding on a ferritic heat-resistant steel containing an abundance of B can be obtained. Furthermore, using this welding material allows a weld metal and a welded joint excellent in creep strength and toughness to be obtained.

As seen from the above, the embodiment according to the present invention has been described. However, the aforementioned embodiment is merely an example for practicing the present invention. Therefore, the present invention is not limited to the previously-mentioned embodiment, and the previously-mentioned embodiment can be modified and implemented as appropriate without departing from the scope of the present invention.

The invention claimed is:

1. A welding material for ferritic heat-resistant steel having a chemical composition containing, in mass percent:
C: 0.06 to 0.10%;
Si: 0.1 to 0.4%;
Mn: 0.3 to 0.7%;
P: 0.01% or less;
S: 0.003% or less;
Co: 2.6 to 3.4%;
Ni: 0.01 to 1.10%;
Cr: 8.5 to 9.5%;
W: 2.5 to 3.5%;
Mo: less than 0.01%;
Nb: 0.02 to 0.08%;
V: 0.1 to 0.3%;
Ta: 0.02 to 0.08%;
B: 0.007 to 0.015%;
N: 0.005 to 0.020%;
Al: 0.03% or less;
O: 0.02% or less;
Cu: 0 to 1%;
Ti: 0 to 0.3%;
Ca: 0 to 0.05%;
Mg: 0 to 0.05%, and
rare earth metals: 0 to 0.1%, with a balance being Fe and impurities, and satisfying Formula (1):

$$0.5 \leq Cr+6Si+1.5W+11V+5Nb+10B-40C-30N-4Ni-2Co-2Mn \leq 10.0 \quad (1)$$

where symbols of elements in Formula (1) are to be substituted by contents of corresponding elements (in mass percent).

2. The welding material for ferritic heat-resistant steel according to claim 1, further containing, in mass percent, an element one or more types selected from following first group to third group:
first group: Cu: 0.05 to 1.00%;
second group: Ti: 0.02 to 0.30%; and
third group: Ca: 0.001 to 0.050%, Mg: 0.001 to 0.050%, and rare earth metals: 0.001 to 0.10% or less.

3. The welding material for ferritic heat-resistant steel according to claim 2, wherein an area fraction of δ ferrite is 0.5% or less.

4. The welded joint for ferritic heat-resistant steel comprising:
a weld metal having the chemical composition according to claim 3; and
a base material made of a ferritic heat-resistant steel, wherein
the base material has a chemical composition containing, in mass percent:
Cr: 8 to 10%;
Co: 2 to 4%;
W: 2 to 4%; and
B: 0.005 to 0.020%.

5. The welded joint for ferritic heat-resistant steel according to claim 4, wherein
the chemical composition of the base material contains, in mass percent:
C: 0.04 to 0.12%;
Si: 0.05 to 0.60%;
Mn: 0.1 to 0.8%;
P: 0.02% or less;
S: 0.01% or less;
Co: 2 to 4%;
Ni: 0 to 0.4%;
Cr: 8 to 10%;
W: 2 to 4%;
Nb and/or Ta: 0.02 to 0.18% in total;
V: 0.05 to 0.40%;
B: 0.005 to 0.020%;
Nd: 0.01 to 0.06%;
N: 0.002 to 0.025%;
Al: 0.03% or less, and
O: 0.02% or less, with the balance being Fe and impurities.

6. The welded joint for ferritic heat-resistant steel according to claim 5, wherein the base material contains Ni: 0.05 to 0.4%.

7. The welded joint for ferritic heat-resistant steel comprising:
a weld metal having the chemical composition according to claim 2; and
a base material made of a ferritic heat-resistant steel, wherein
the base material has a chemical composition containing, in mass percent:
Cr: 8 to 10%;
Co: 2 to 4%;
W: 2 to 4%; and
B: 0.005 to 0.020%.

8. The welded joint for ferritic heat-resistant steel according to claim 7, wherein
the chemical composition of the base material contains, in mass percent:
C: 0.04 to 0.12%;
Si: 0.05 to 0.60%;
Mn: 0.1 to 0.8%;
P: 0.02% or less;
S: 0.01% or less;
Co: 2 to 4%;
Ni: 0 to 0.4%;
Cr: 8 to 10%;
W: 2 to 4%;
Nb and/or Ta: 0.02 to 0.18% in total;
V: 0.05 to 0.40%;
B: 0.005 to 0.020%;
Nd: 0.01 to 0.06%;
N: 0.002 to 0.025%;
Al: 0.03% or less, and
O: 0.02% or less, with the balance being Fe and impurities.

9. The welded joint for ferritic heat-resistant steel according to claim 8, wherein the base material contains Ni: 0.05 to 0.4%.

10. The welded joint for ferritic heat-resistant steel according to claim 7, wherein an area fraction of δ ferrite in the weld metal is 0.5% or less.

11. The welding material for ferritic heat-resistant steel according to claim 1, wherein an area fraction of δ ferrite is 0.5% or less.

12. The welded joint for ferritic heat-resistant steel comprising:
a weld metal having the chemical composition according to claim 11; and
a base material made of a ferritic heat-resistant steel, wherein
the base material has a chemical composition containing, in mass percent:
Cr: 8 to 10%;
Co: 2 to 4%;
W: 2 to 4%; and
B: 0.005 to 0.020%.

13. The welded joint for ferritic heat-resistant steel according to claim 12, wherein
the chemical composition of the base material contains, in mass percent:
C: 0.04 to 0.12%;
Si: 0.05 to 0.60%;
Mn: 0.1 to 0.8%;
P: 0.02% or less;
S: 0.01% or less;
Co: 2 to 4%;
Ni: 0 to 0.4%;
Cr: 8 to 10%;
W: 2 to 4%;
Nb and/or Ta: 0.02 to 0.18% in total;
V: 0.05 to 0.40%;
B: 0.005 to 0.020%;
Nd: 0.01 to 0.06%;
N: 0.002 to 0.025%;
Al: 0.03% or less, and
O: 0.02% or less, with the balance being Fe and impurities.

14. The welded joint for ferritic heat-resistant steel according to claim 13, wherein the base material contains Ni: 0.05 to 0.4%.

15. The welded joint for ferritic heat-resistant steel according to claim 12, wherein an area fraction of δ ferrite in the weld metal is 0.5% or less.

16. A welded joint for ferritic heat-resistant steel comprising:
a weld metal having the chemical composition according to claim 1; and
a base material made of a ferritic heat-resistant steel, wherein
the base material has a chemical composition containing, in mass percent:
Cr: 8 to 10%;
Co: 2 to 4%;
W: 2 to 4%; and
B: 0.005 to 0.020%.

17. The welded joint for ferritic heat-resistant steel according to claim 16, wherein
the chemical composition of the base material contains, in mass percent:
C: 0.04 to 0.12%;
Si: 0.05 to 0.60%;
Mn: 0.1 to 0.8%;
P: 0.02% or less;
S: 0.01% or less;
Co: 2 to 4%;
Ni: 0 to 0.4%;
Cr: 8 to 10%;
W: 2 to 4%;
Nb and/or Ta: 0.02 to 0.18% in total;
V: 0.05 to 0.40%;
B. 0.005 to 0.020%;

Nd: 0.01 to 0.06%;
N: 0.002 to 0.025%;
Al: 0.03% or less, and
O: 0.02% or less, with the balance being Fe and impurities.

18. The welded joint for ferritic heat-resistant steel according to claim 17, wherein the base material contains Ni: 0.05 to 0.4%.

19. The welded joint for Ferritic heat-resistant steel according to claim 16, wherein an area fraction of δ ferrite in the weld metal is 0.5% or less.

20. A method for producing a welded joint for ferritic heat-resistant steel, the method comprising:
- a step of forming a weld metal by performing gas tungsten arc welding on a base material made of a ferritic heat-resistant steel, with a welding heat input of 6 to 20 kJ/cm using the welding material for ferritic heat-resistant steel according to claim 1, the ferritic heat-resistant steel having a chemical composition containing, in mass percent, Cr: 8 to 10%, Co: 2 to 4%, W: 2 to 4%, and B: 0.005 to 0.020%; and
- a step of performing heat treatment on the weld metal formed on the base material at a heat treatment temperature of 740 to 780° C. for 0.5 to 4.0 hours per 25.4 mm thickness of the base material.

* * * * *